(12) United States Patent
Kobzda et al.

(10) Patent No.: US 9,792,009 B2
(45) Date of Patent: Oct. 17, 2017

(54) METHOD AND SYSTEM FOR FOCUS MANAGEMENT IN A SOFTWARE APPLICATION

(71) Applicant: ADVANCED DIGITAL BROADCAST S.A., Chambesy (CH)

(72) Inventors: Piotr Kobzda, Zielona Gora (PL); Pawel Pingot, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 487 days.

(21) Appl. No.: 14/629,514

(22) Filed: Feb. 24, 2015

(65) Prior Publication Data
US 2015/0242081 A1   Aug. 27, 2015

(30) Foreign Application Priority Data

Feb. 26, 2014   (EP) .................................... 14156746

(51) Int. Cl.
*G06F 3/0484* (2013.01)
*G06F 9/54* (2006.01)
*G06F 9/44* (2006.01)
*G06F 3/0481* (2013.01)

(52) U.S. Cl.
CPC .......... *G06F 3/0484* (2013.01); *G06F 3/0481* (2013.01); *G06F 9/4443* (2013.01); *G06F 9/542* (2013.01); *G06F 2209/545* (2013.01)

(58) Field of Classification Search
CPC .................................................... G06F 3/0484
USPC ......................................................... 715/767
See application file for complete search history.

(56) References Cited

U.S. PATENT DOCUMENTS

| 4,975,690 | A  | * | 12/1990 | Torres ................... | G06F 3/0481 715/212 |
| 5,687,331 | A  | * | 11/1997 | Volk ..................... | G06F 3/04847 348/E7.071 |
| 6,971,067 | B1 | * | 11/2005 | Karson ................. | G06F 9/4443 705/2 |
| 8,347,215 | B2 | * | 1/2013  | Carpenter ............... | G06F 3/048 715/754 |
| 8,595,642 | B1 | * | 11/2013 | Lagassey ................ | G06F 3/048 704/275 |
| 2002/0194388 | A1 | * | 12/2002 | Boloker ............... | G06Q 20/208 709/251 |
| 2003/0210270 | A1 | * | 11/2003 | Clow .................... | G06F 3/0481 715/767 |

(Continued)

*Primary Examiner* — Reza Nabi
(74) *Attorney, Agent, or Firm* — Mark M. Friedman

(57) ABSTRACT

A method for focus management in a software application, wherein at least a subset of Node objects of said software application forms a hierarchy of Node objects and wherein each Node object of said hierarchy of Node objects of said software application comprises: a first routine that when returning true denotes that the Node object is a focused one; and a second routine that when returning true denotes that the Node object is a focused, or at least one of its descendants is a focused; a routine for handling an incoming event; the method comprising the steps of: providing, for each Node object of said hierarchy of Node objects a third routine, that when returning true denotes that the Node object and all descendants of the Node object, excluding these Node objects for which the third routine returns true, forms a single monofocus area having a single focus root.

13 Claims, 13 Drawing Sheets

(56) References Cited

U.S. PATENT DOCUMENTS

| | | | |
|---|---|---|---|
| 2005/0052434 A1* | 3/2005 | Kolmykov-Zotov | G06F 3/038 345/179 |
| 2007/0092243 A1* | 4/2007 | Allen | G06F 3/0482 396/121 |
| 2007/0214426 A1* | 9/2007 | Ruelle | G06F 3/0481 715/767 |
| 2007/0261005 A1* | 11/2007 | Kreiner | G06F 9/4443 715/830 |
| 2008/0005292 A1* | 1/2008 | Vinberg | H04L 41/00 709/223 |
| 2008/0168498 A1* | 7/2008 | Koh | G06F 3/04842 725/43 |
| 2009/0082110 A1* | 3/2009 | Relyea | G07F 17/32 463/42 |
| 2012/0072867 A1* | 3/2012 | Schlegel | G06F 3/0481 715/808 |
| 2012/0291031 A1* | 11/2012 | Tang | G06F 9/4448 718/1 |
| 2013/0111371 A1* | 5/2013 | Reeves | G06F 3/04883 715/761 |
| 2013/0332896 A1* | 12/2013 | Narayana | G06Q 10/06 717/101 |
| 2014/0173569 A1* | 6/2014 | Krauss | G06F 11/362 717/125 |
| 2015/0088977 A1* | 3/2015 | Monesson | H04L 65/605 709/203 |
| 2015/0242081 A1* | 8/2015 | Kobzda | G06F 3/0484 715/767 |
| 2015/0242106 A1* | 8/2015 | Penha | G06F 3/04847 715/854 |

* cited by examiner

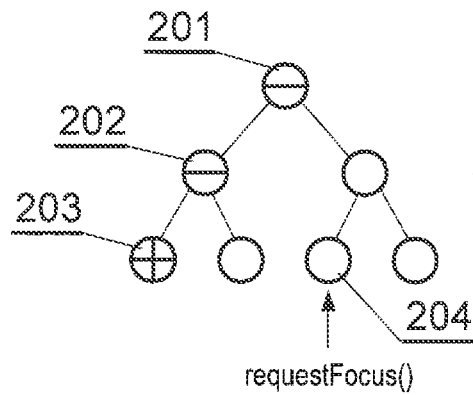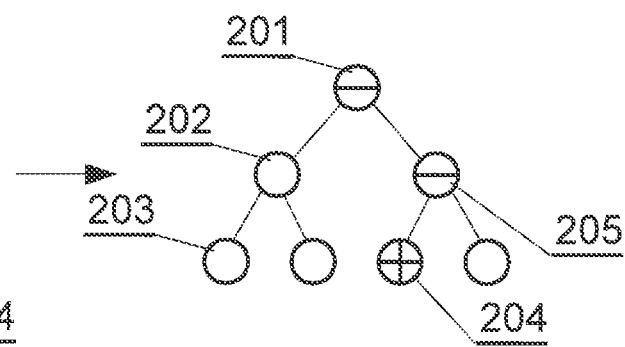
Fig. 2A  Fig. 2B
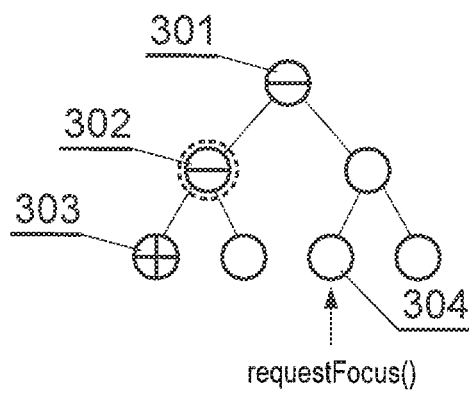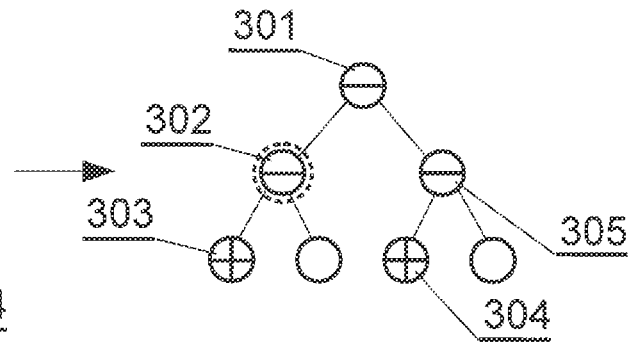
Fig. 3A  Fig. 3B

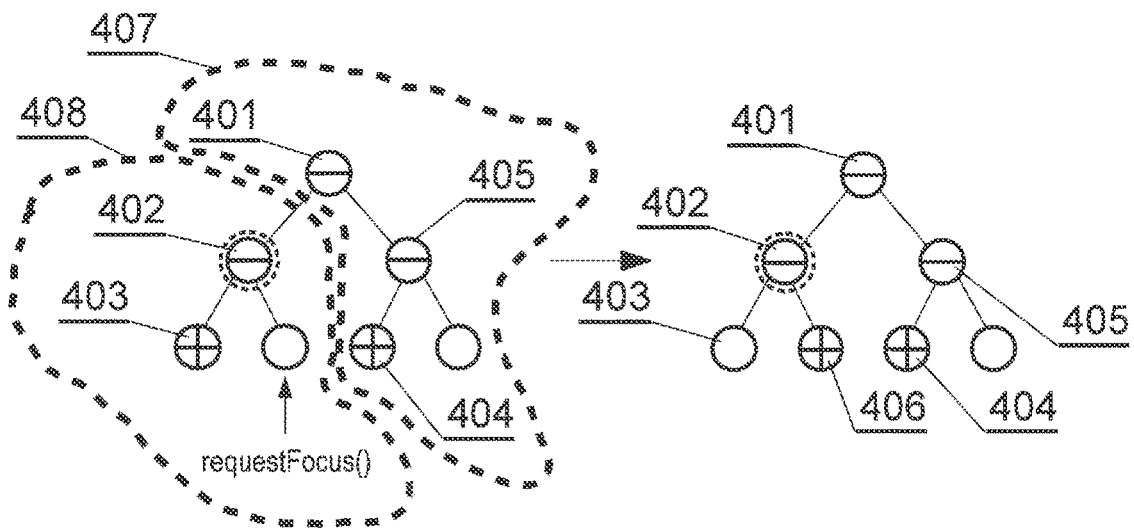
Fig. 4A                   Fig. 4B
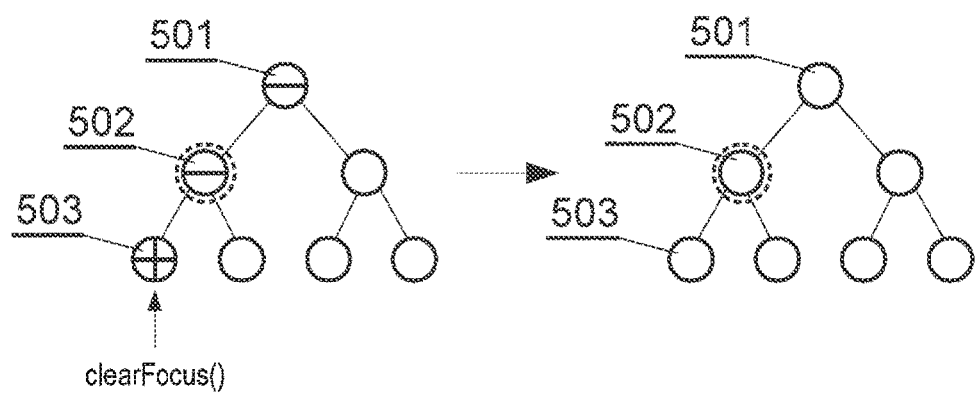
Fig. 5A                   Fig. 5B

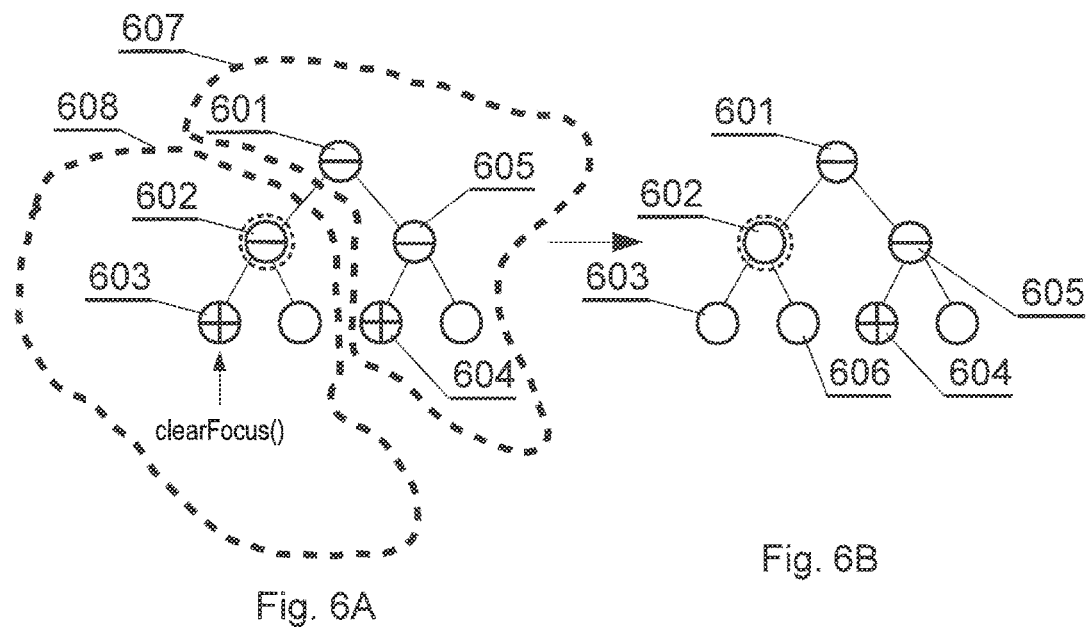
Fig. 6A
Fig. 6B
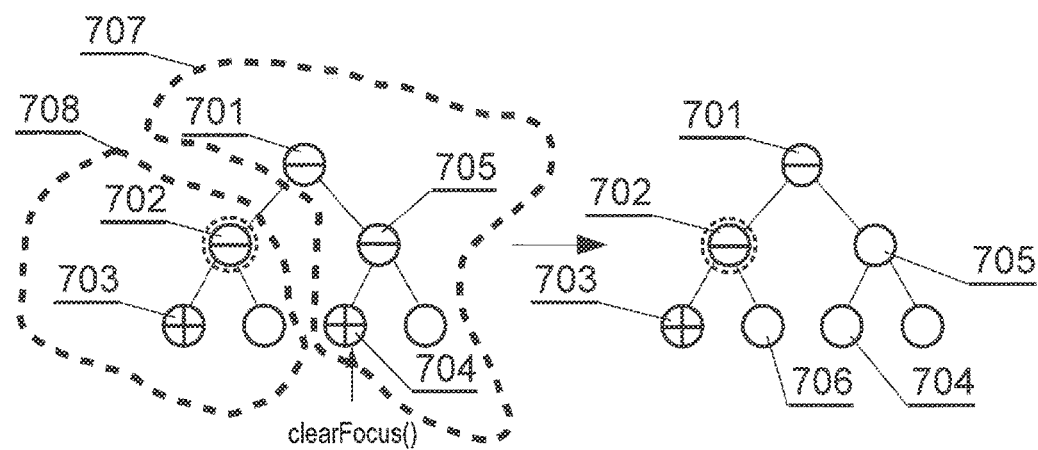
Fig. 7A
Fig. 7B

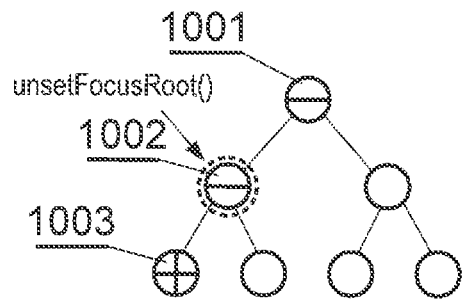 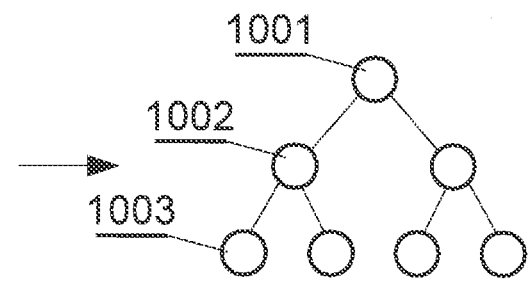
Fig. 10A　　　　　　　　　　Fig. 10B
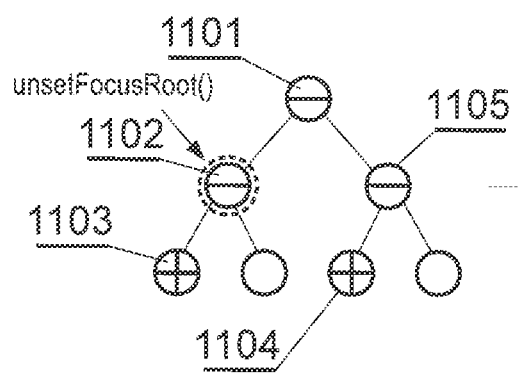 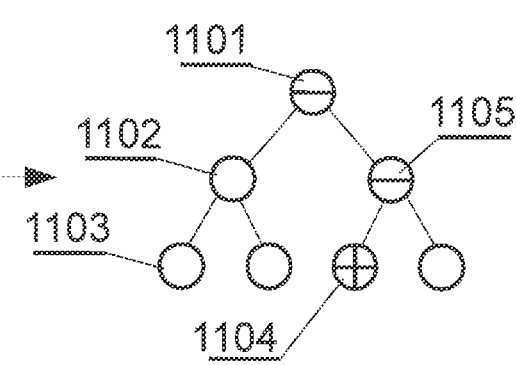
Fig. 11A　　　　　　　　　　Fig. 11B

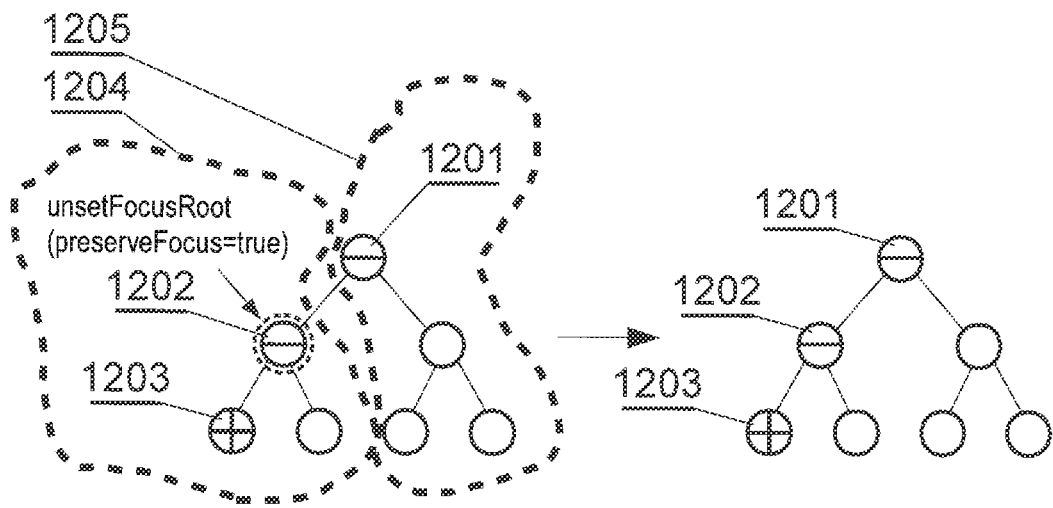
Fig. 12A                    Fig. 12B
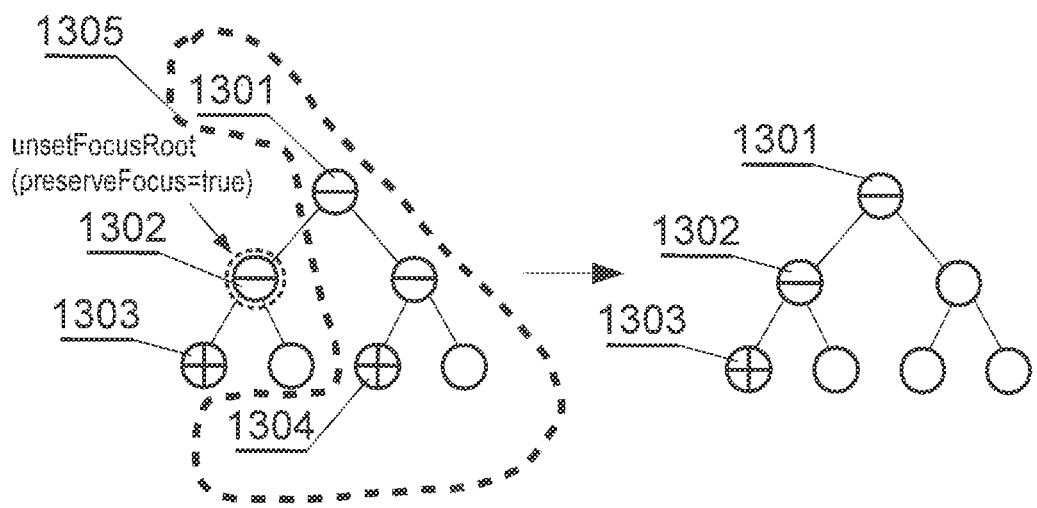
Fig. 13A                    Fig. 13B

METHOD AND SYSTEM FOR FOCUS MANAGEMENT IN A SOFTWARE APPLICATION

TECHNICAL FIELD

The present invention relates to a method and system for focus management in a software application. In particular, the invention is applicable in graphical user interface (GUI) software where it is advantageous to have a multiple focus capability.

BACKGROUND ART

In computing, the focus indicates the component of the graphical user interface which is selected to receive input. Text entered at the keyboard or pasted from a clipboard is sent to the component which has the focus. Moving the focus away from a specific user interface element is known as a blur event in relation to this element. Typically, the focus is withdrawn from an element by giving another element the focus. This means that focus and blur events typically both occur virtually simultaneously, but in relation to different user interface elements, one that gets the focus and one that gets blurred (source: Wikipedia).

In other words, object focus is by its nature an exclusive property of a GUI object—only a single component within components hierarchy may be focused.

In this context there is typically applied a boolean property called "focused" that indicates a focused object, usually complemented with additional boolean property called "has focus". The object having the "focused" property set to true is the exclusively focused object in the objects hierarchy. The "has focus" property is different from "focused" property in that if "has focus" is true it means that a given object or one of his descendants is focused. There is a chain of "has focus"-ed objects till an object that has "is focused" set to true is reached.

This approach is used in so-called event capturing or bubbling techniques.

The main principle of bubbling is that after an event triggers on the deepest possible element, it then triggers on parents in nesting order. The bubbling goes to the top of objects hierarchy. When an event occurs on an object, it will bubble up to the parent object, triggering appropriate handlers. In any case a handler may decide that event is fully processed and stop the bubbling.

In turn capturing is opposite to bubbling and starts at the top object in the hierarchy in order to propagate downwards in the hierarchy structure of the objects tree.

A known prior art patent publication of U.S. Pat. No. 8,347,215 B2 entitled "Simultaneous input across multiple applications" discloses that one or more users may interact simultaneously with different applications on the same device through an input system such as a touch-sensitive display screen. Simultaneous user input may be detected by a multiple input system and subsequently transmitted to an application using a single transmission frame. An application corresponding to the user input is determined based on an input location of the user input and a location and size of a corresponding application. Simultaneous user inputs are rendered simultaneously by each corresponding application. Each application may further include a secondary event processing thread that runs in parallel to traditional operating system event threads. The secondary event processing thread bypasses sequential processing limits of an operating system event thread, providing substantially simultaneous processing of input.

A drawback of this solution is that different focus managers must be employed. Another disadvantage is that a special secondary event processing thread that bypasses typical event propagation architecture must be applied. Hence it is a significant interference with the legacy systems. Further there is a separate event distribution manager and multithreaded event processing, which is very resource consuming, for example in terms of subsequent resources synchronization.

Another prior art publication of EP0368779 B1 entitled "Method for concurrent data entry and manipulation in multiple applications" discloses methods for inputting common data into a plurality of computer application programs and in particular to methods for automatically and concurrently entering common data into a plurality of computer application programs. Still more particularly, this invention relates to methods which permit the concurrent manipulation of common data which is present within a plurality of computer application programs.

A drawback of this solution is that a special action must be performed by a user on several components and that all the selected components must act in the same manner.

It is sometimes needed to have more than one component that is in focus and may receive events such as keyboard keystrokes notifications. Another advantage of multi focus system is that a single application may run a plurality of submodules that may be unrelated to each other.

Therefore, there exists a problem of efficient implementation of a multi focus system in a software application.

It would be thus desirable to provide an improved method for managing multi focus in a software application.

SUMMARY OF THE INVENTION

The object of the present invention is a method for focus management in a software application, wherein at least a subset of Node objects of said software application forms a hierarchy of Node objects and wherein each Node object of said hierarchy of Node objects of said software application comprises: a first routine that when returning true denotes that the Node object is a focused one; and a second routine that when returning true denotes that the Node object is a focused, or at least one of its descendants is a focused; a routine for handling an incoming event; the method comprising the steps of: providing, for each Node object of said hierarchy of Node objects a third routine, that when returning true denotes that the Node object and all descendants of the Node object, excluding these Node objects for which the third routine returns true, forms a single monofocus area having a single focus root.

Preferably, the first routine is a isFocused( ) routine, the second routine is an hasFocus( ) routine and the third routine is a isFocusRoot( ) routine.

Preferably, the routine for handling an incoming event is such that it guarantees that the event being dispatched will first be processed by focused focus roots Node objects before handling of the event by focused child Node object.

Preferably, the routine for handling an incoming event comprises the steps of: handling the event by a focus root; dispatching the event to focus roots; and handling the event by a focus owner.

Preferably, the handling the event by a focus root comprises the steps of: checking whether the Node object is a focused focus root and then handling of the event.

Preferably, the dispatching the event to focus roots comprises the steps of: iterating in a loop, in reverse z-order, all children nodes of the Node object that has the focus, except for child node that is focused or has descendant a focus owner child of the monofocus subsection comprising the given Node object; dispatching the event to the Node objects that are found to be a focused focus roots.

Preferably, the handling the event by a focus owner comprises the steps of: dispatching of the event to the focused child node or, if the given Node object is focused and is not focus root, handling the event by the Node object itself.

Preferably, the method further comprises a step oft providing for each Node object a fourth routine unsetting the property referred to by said third routine wherein the fourth routine takes a preserve focus parameter as an input and is configured to clear focus on all conflicting nodes while preserving the focus where it was before the fourth routine execution.

Preferably, the conflict of focus exists with a parent monofocus subsection, to which the monofocus subsection under consideration is to be joined.

Another object of the present invention is a computer program comprising program code means for performing all the steps of the method according to the method of the present invention when said program is run on a computer.

Another object of the present invention is a computer readable medium storing computer-executable instructions performing all the steps of the method according to the present invention when executed on a computer.

Yet another object of the present invention is a system for focus management the system comprising: a data bus communicatively coupled to a memory; a controller communicatively coupled to the system bus; the system further comprising: an events sources controller for monitoring hardware event sources in order to receive events and notify the events, by means of the event capture module to an event dispatcher module; wherein the event dispatcher module is configured to, under the supervision of the main controller, manage dispatching events to respective objects, in a given hierarchy of application objects, that are stored in an objects hierarchy database wherein each object in the objects hierarchy database is a Node object according to the aforementioned method of the present invention.

Preferably, the event dispatcher module is configured to operate according to a method of the present invention.

Preferably, the main controller is configured to execute one or more software applications stored in the memory.

Preferably, the applications preferably comprise a graphical user interface.

BRIEF DESCRIPTION OF THE DRAWINGS

The present invention is shown by means of exemplary embodiments on a drawing, in which:

FIG. 2A and FIG. 2B present a relation between hasFocus( ) and isFocused( ) in a classic focus approach;

FIG. 3A and FIG. 3B present focus approach according to the present invention;

FIG. 4A and FIG. 4B present a different example of the focus approach according to the present invention;

FIG. 5A and FIG. 5B present a first clear focus scenario;

FIG. 6A and FIG. 6B present a second clear focus scenario;

FIG. 7A and FIG. 7B present a third clear focus scenario;

FIG. 10A and FIG. 10B present a first unset focus root scenario;

FIG. 11A and FIG. 11B present a second unset focus root scenario;

FIG. 12A and FIG. 12B present a first unset focus root scenario with focus preservation;

FIG. 13A and FIG. 13B present a second unset focus root scenario with focus preservation;

DETAILED DESCRIPTION OF THE PREFERRED EMBODIMENTS

Notation and Nomenclature

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

Figure 1A:
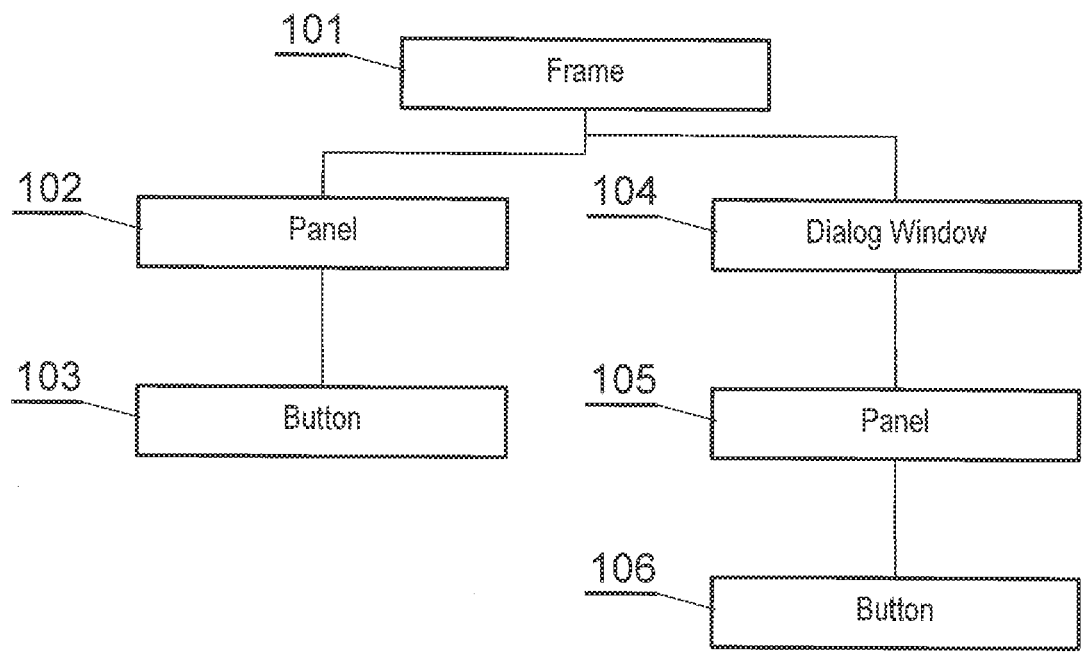
FIGS. 1A and 1B present a simple objects hierarchy example.

FIG. 1A presents a simple objects hierarchy example. The example includes a main window object 101 (such as JFrame in Java), which is a top object in the objects tree. The window 101 comprises two child objects 102 and 104 that are in this case a panel (such as JPanel in Java) and a dialog window (such as JDialog in Java). Each first level child object comprises a second level child object 103, 105 that in this case are a panel and a button object (such as JButton in Java). Similarly, in case of the 105 panel a third level child object in present i.e. a button 106. In case the button 106 is focused, no other GUI object may be focused as well.

In order to be presented on a display screen, every GUI component must be part of a containment hierarchy. A containment hierarchy is a tree of components that has a top-level container as its root. In this case the component 101 is a root. Each root component has a content pane that comprises (directly or indirectly) the visible components in that top-level container's GUI.

Figure 1B:
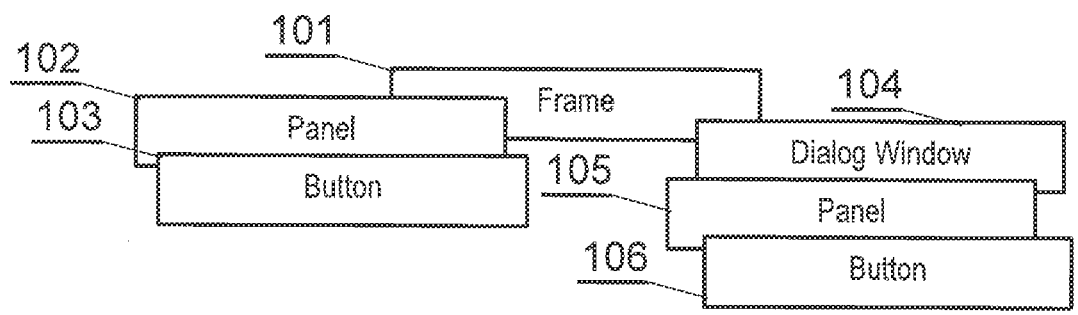

FIG. 1B presents the same components positioned in a parent-child relationship in order to better visually present their relationships in the graphical user interface.

It is the aim of the present invention to, for example, facilitate focus for example on the component 103 as well as on the component 106 at the sime time.

FIGS. 2A to 13B refer to different uses and exemplary, non-limitative cases of requesting focus, clearing focus, setting focus root and unsetting focus root.

The notation in these figures is such that a horizontal dash in the circle denotes that the hasFocus( ) property of the given node is set to true. Further, a vertical dash in the circle denotes that the isFocused( ) property of the given node is set to true. Further, a circle drawn with a dashed line around a given node's circle denotes that the isFocusRoot( ) property of the given node of the hierarchy is set to true.

FIG. 2A and FIG. 2B present a relation between hasFocus( ) and isFocused( ) properties in a classic focus single focus approach. In FIG. 2A a focused element 203 has the hasFocus( ) and isFocused( ) properties set to true while the elements 202 and 201 only have hasFocus( ) property set to true while isFocused( ) property remains set to false. This is because one of their descendants is focused.

In case focus is requested by a 204 element, the arrangement shown in FIG. 2B will be the result. The 204 element does not have focus and its hasFocus( ) and isFocused( ) properties are both set to false. The previously set hasFocus( ) property of the 202 component is not also set to false as none of its descendants is focused.

On the other hand a focused element 204 has the hasFocus( ) and isFocused( ) properties set to true while the elements 205 and 201 only have hasFocus( ) property set to true while isFocused( ) property remains set to false. This is again because one of their descendants is focused.

The present invention introduces to the arrangement shown in FIG. 2A and FIG. 2B another boolean property of node (sometimes referred to as an element or a component) called "focus root", indicated as isFocusRoot( ) routine.

Consequently, the key node actions are requestFocus( ), clearFocus( ), setFocusRoot( ), unsetFocusRoot( ) and their tasks are self explanatory given their names.

Further, the nodes states (properties) are as follows: isFocused( ), hasFocus( ) and isFocusRoot( ).

FIG. 3A and FIG. 3B present focus approach according to the present invention. In FIG. 3A a focused element 303 has the hasFocus( ) and isFocused( ) properties set to true while the element 302 has the isFocusRoot( ) property set to true and the hasFocus( ) property set to true (the isFocused( ) property is set to false) and the element 301 only has hasFocus( ) property set to true while the isFocused( ) property remains set to false. This is because one of their descendants, in particular the 303 node, is focused.

It is to be noted that the isFocusRoot( ) property may be set to true on any node of the objects hierarchy and that there may be multiple objects having isFocusRoot( ) property set to true.

In case focus is requested by a 304 element, the arrangement shown in FIG. 3B will be the result. The 304 element does not have focus and its hasFocus( ) and isFocused( ) properties are initially both set to false. The configuration of the 301, 302 and 303 elements remains as the isFocusRoot( ) property remains set to true and the node 303 having isFocused( ) property set to true is not affected by focus change.

On the other hand a focused element 304 has the hasFocus( ) and isFocused( ) properties set to true while the elements 305 and 301 only have hasFocus( ) property set to true while isFocused( ) property remains set to false. This is again because one of their descendants is focused.

FIG. 4A and FIG. 4B present another example of the focus approach according to the present invention. It relates to requesting focus in case when there are two focused objects 403 and 404, one of which is under focus root node.

In FIG. 4A a focused element 403 has the hasFocus( ) and isFocused( ) properties set to true while the element 402 has the isFocusRoot( ) property set to true and the hasFocus( ) property set to true (the isFocused( ) property is set to false) and the element 401 only has hasFocus( ) property set to true while the isFocused( ) property remains set to false. This is because one of their descendants, 403 node, is focused.

Additionally, the element 404 is a focused element i.e. both hasFocus( ) and isFocused( ) properties are set to true while the isFocusRoot( ) property is set to false. Consequently, the 405 and 401 nodes have the hasFocus( ) property set to true and the isFocused( ) property set to false and further the respective isFocusRoot( ) property set to false.

Setting the isFocusRoot( ) property to true creates in a sense a subrange of hierarchy nodes in which a single focus arrangement exists. For example, a single focus arrangement exists for nodes group 407 and simultaneously a single focus arrangement exists for nodes group 408. Such approach creates as a result multiple monofocus subsections 407, 408 in the objects tree hierarchy.

More generally, a isFocusRoot( ) property set to true denotes that the Node object and all descendants of the Node object, except for other descendant Node objects having the isFocusRoot( ) property set to true, form a single monofocus area having a single focus root. In other words, the aforementioned single monofocus area excludes these Node objects for which the isFocusRoot( ) property is set to true.

Owing to this approach an exemplary focus change will be defined as shown in FIG. 4B.

In view of the above, when focus is requested for node 406, which is within the group 408, the focus will be cleared from the 403 node and set on the 406 node. This will not affect nodes present in the group 407 as shown in FIG. 4B.

FIG. 5A and FIG. 5B present a first clear focus scenario. In FIG. 5A a focused element 503 has the hasFocus( ) and isFocused( ) properties set to true while the element 502 has the isFocusRoot( ) property set to true and the hasFocus( ) property set to true (the isFocused( ) property is set to false) and the element 501 only has hasFocus( ) property set to true while the isFocused( ) property remains set to false. This is because one of their descendants is focused.

Clearing focus in the arrangement of FIG. 5A will result in a state of FIG. 5B wherein the 502 element remains with its isFocusRoot( ) property set to true end the hasFocus( ) and isFocused( ) properties set to false while for the nodes 501 and 503 all of the three properties are set to false. Consequently, there is not any focused node in the objects hierarchy.

FIG. 6A and FIG. 6B present a second clear focus scenario. The scenario relates to clearing focus in case when there are two focused objects 603, 604 one of which is under a focus root node 602.

In FIG. 6A a focused element 603 has the hasFocus( ) and the isFocused( ) properties set to true while the element 602 has the respective isFocusRoot( ) property set to true and the hasFocus( ) property set to true (the isFocused( ) property is set to false) and the element 601 only has the hasFocus( )

property set to true while the isFocused( ) property remains set to false. This is because one of their descendants, the 603 node, is a focused node.

Additionally, the element 604 is a focused element i.e. the hasFocus( ) and the isFocused( ) properties are set to true while the isFocusRoot( ) property is set to false. Consequently, the aforementioned 605 and 601 nodes have hasFocus( ) property set to true and isFocused( ) property set to false and isFocusRoot( ) property set to false.

As already explained in such a case single focus arrangement exists for nodes 607 and simultaneously a single focus arrangement exists for nodes 608. Owing to this approach an exemplary focus clear will be defined as shown in FIG. 6B.

In view of the above, when focus is cleared for the node 603, which is within the group 608, the focus set on the 606 node will not be affected regarding focus.

FIG. 7A and FIG. 7B present a third clear focus scenario. In FIG. 7A a focused element 703 has the hasFocus( ) and isFocused( ) properties set to true while the element 702 has the isFocusRoot( ) property set to true and the hasFocus( ) property set to true (the isFocused( ) property is set to false) and the element 701 only has hasFocus( ) property set to true while the isFocused( ) property remains set to false. This is because one of their descendants is focused.

Additionally, the element 704 is a focused element i.e. the hasFocus( ) and the isFocused( ) properties are set to true while the isFocusRoot( ) property is set to false. Consequently, the 705 and 701 nodes have the hasFocus( ) property set to true and the isFocused( ) property set to false and the respective isFocusRoot( ) property set to false.

As already explained in such a case single focus arrangement exists for nodes 707 and simultaneously a single focus arrangement exists for nodes 708. Owing to this approach an exemplary outcome of a focus clear action will be defined as shown in FIG. 7B.

In view of the above detailed explanation, when focus is cleared for node 704, which is within the nodes group 707, the isFocused property and the hasFocus( ) property are both cleared for the node 704 while the hasFocus( ) property is cleared from the 705 node i.e. set to false. The hasFocus( ) property remains set to true for the 701 node as one of its descendants, the 703 node is currently focused.

The following FIGS. 8A-9B present different examples of setFocusRoot( ) scenarios moving or setting focus on given nodes. It is to be noted that current focus within the hierarchy tree is never affected by setting focus root on an additional node.

Figures 8A, 8B:
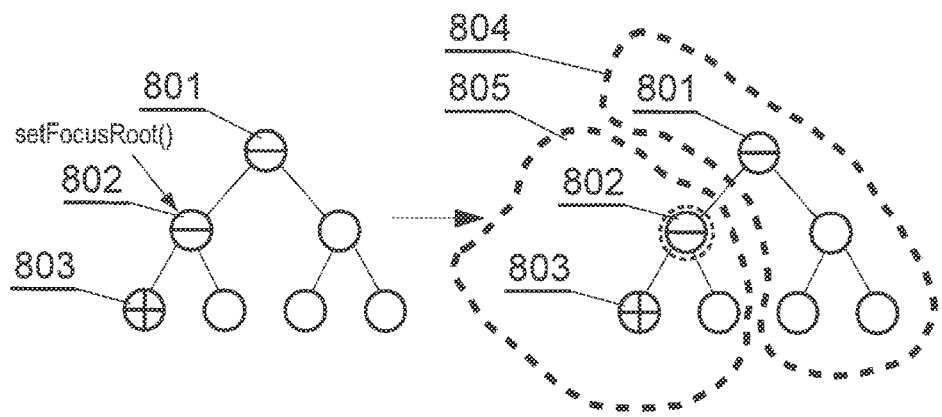
FIG. 8A and FIG. 8B present a first set focus root scenario.

FIG. 8A and FIG. 8B present a first set focus root scenario. In FIG. 8A a focused element 803 has the hasFocus( ) and the isFocused( ) properties set to true while the element 802 has the hasFocus( ) property set to true (the isFocused( ) property is set to false and isFocusRoot( ) property is set to false) and the element 801 only has the hasFocus( ) property set to true while the isFocused( ) and the isFocusRoot( ) properties remain set to false. This is because one of their descendants, namely the 803 node, is focused.

In this state there may be only one focused object as all nodes form a single set of nodes because there is not any focus root object having the isFocusRoot( ) property set to true.

In this scenario focus root is requested for node 802, which results in an arrangement shown in FIG. 8B. In this case the only element that changes in comparison to FIG. 8A is that the isFocusRoot( ) property is set to true for the 802 node. This results in that two monofocus subsections are created within the objects hierarchy. Namely these monofocus subsections are outlined as 804 and 805 subsections.

Figures 9A, 9B:
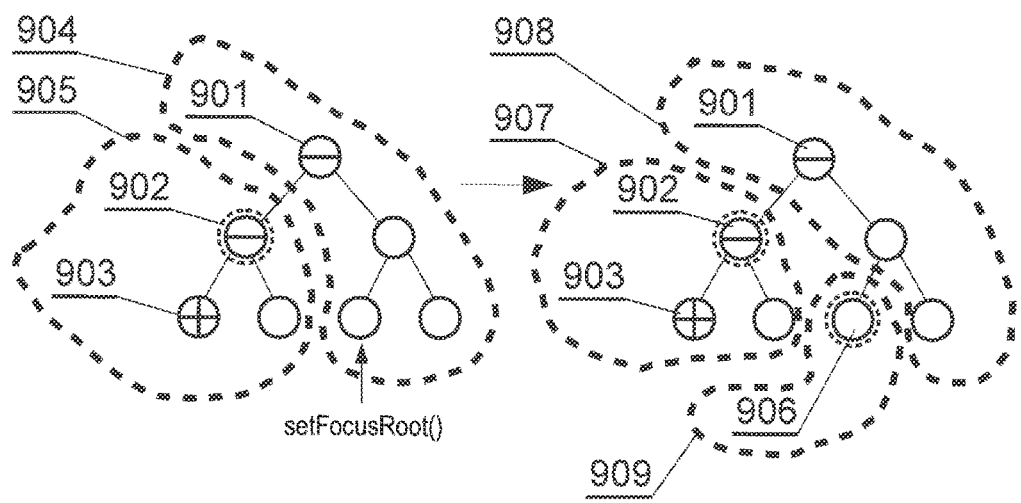
FIG. 9A and FIG. 9B present a second set focus root scenario.

FIG. 9A and FIG. 9B present a second set focus root scenario. The arrangement of nodes 901-905 in FIG. 9A corresponds to the state as shown in FIG. 8B. The state is further modified by setting another focus root on node 906, for which the isFocusRoot( ) property is set to true. This results in that the two monofocus subsections are modified into three monofocus areas created within the same objects hierarchy. Namely these monofocus subsections are outlined as 907, 908 and 909 subsections.

FIG. 10A and FIG. 10B present a first unset focus root scenario. If focus ownership, within focus root subtree, does not conflict with classic single focus semantics, then it may optionally be preserved after unsetting a focus root. Normally, however unsetFocusRoot( ) always invokes a clearFocus( ) routine.

In the optional arrangement there may be a property present in the unsetFocusRoot( ) routine such as preserveFocus (Boolean) which would indicate that all conflicting nodes, in terms of focus, are cleared while preserving the focus where it was before unsetFocusRoot( ) execution.

In FIG. 10A a focused element 1003 has the hasFocus( ) and isFocused( ) properties set to true while the element 1002 has the hasFocus( ) property and isFocusRoot( ) property set to true (the isFocused( ) property is set to false) and the element 1001 only has hasFocus( ) property set to true while the isFocused( ) and isFocusRoot( ) properties remain set to false. This is because one of their descendants is focused.

In such state of the objects tree the unsetFocusRoot( ) routine is executed resulting in the FIG. 10B state of the objects hierarchy. In such state, all three properties i.e. hasFocus( ), isFocused( ) and isFocusRoot( ) are set to false for all objects. The properties previously set to true for objects 1001-1003 are now set to false because focus root is removed and the focus is cleared under 1002 node of the hierarchy.

FIG. 11A and FIG. 11B present a second unset focus root scenario. In this scenario focus ownership within focus root subtree is in conflict with classic focus semantics. In such case the clearing must be executed (i.e. clearFocus( ) is performed) before unsetting focus root.

In FIG. 11A a focused element 1103 has the hasFocus( ) and isFocused( ) properties set to true, while the element 1102 has the isFocusRoot( ) property set to true and the hasFocus( ) property set to true (the isFocused( ) property is set to false) and the element 1101 only has hasFocus( ) property set to true, while the isFocused( ) property remains set to false. This is because one of their 1001, 1002 descendants 1003 is focused.

Further, the 1104 node has the hasFocus( ) and isFocused( ) properties set to true while the elements 1105 and 1101 only have hasFocus( ) property set to true while isFocused( ) property remains set to false. This is again because one of their descendants is focused.

If in such a state of the objects hierarchy, a request to unset the focus root for the 1102 object is invoked, the output state as shown in FIG. 11B will be the final result. The focus root 1102 is unset by setting the isFocusRoot( ) and the hasFocus( ) properties to false and prior to that, clearing the focus from the 1103 node by setting the hasFocus( ) and the isFocused( ) properties to false. Consequently, there is not any focus root present in the FIG. 11B objects hierarchy and all nodes operate under a classic monofocus arrangement until a focus root is established in the objects hierarchy.

FIG. 12A and FIG. 12B present a first unset focus root scenario with focus preservation. This is an optional approach as previously indicated. The FIG. 12A arrangement matches FIG. 10A. The difference lies however in the output arrangement of FIG. 12B in comparison to FIG. 10B.

By using a special preserveFocus option set to true (preferably a parameter of a boolean type), the user may indicate that, at a time when the unsetFocusRoot( ) routine is invoked, the focus within this monofocus subsection 1204 shall be preserved.

Therefore, as clearly shown in FIG. 12B, only the 1202 node's isFocusRoot( ) property is set to false since there are no conflicts of focus with a parent monofocus subsection 1205, to which the monofocus subsection 1204 under consideration will be joined.

FIG. 13A and FIG. 13B present a second unset focus root scenario with focus preservation. This is an optional approach as previously indicated. The FIG. 12A arrangement matches FIG. 11A. The difference lies however in the output arrangement of FIG. 13B in comparison to FIG. 10B.

By using the preserveFocus option set to true the user may indicate that at a time when the unsetFocusRoot( ) routine is invoked the focus within this monofocus subsection shall be preserved. Therefore, as shown in FIG. 13B, the 1304 focus present in the parent monofocus subsection 1305 shall be cleared in order to preserve focus unchanged on the node focused in the child monofocus subsection.

In case there are multiple levels of objects hierarchy, the focus preservation method only evaluates a potential conflict with its direct parent monofocus subsection.

Figure 14:
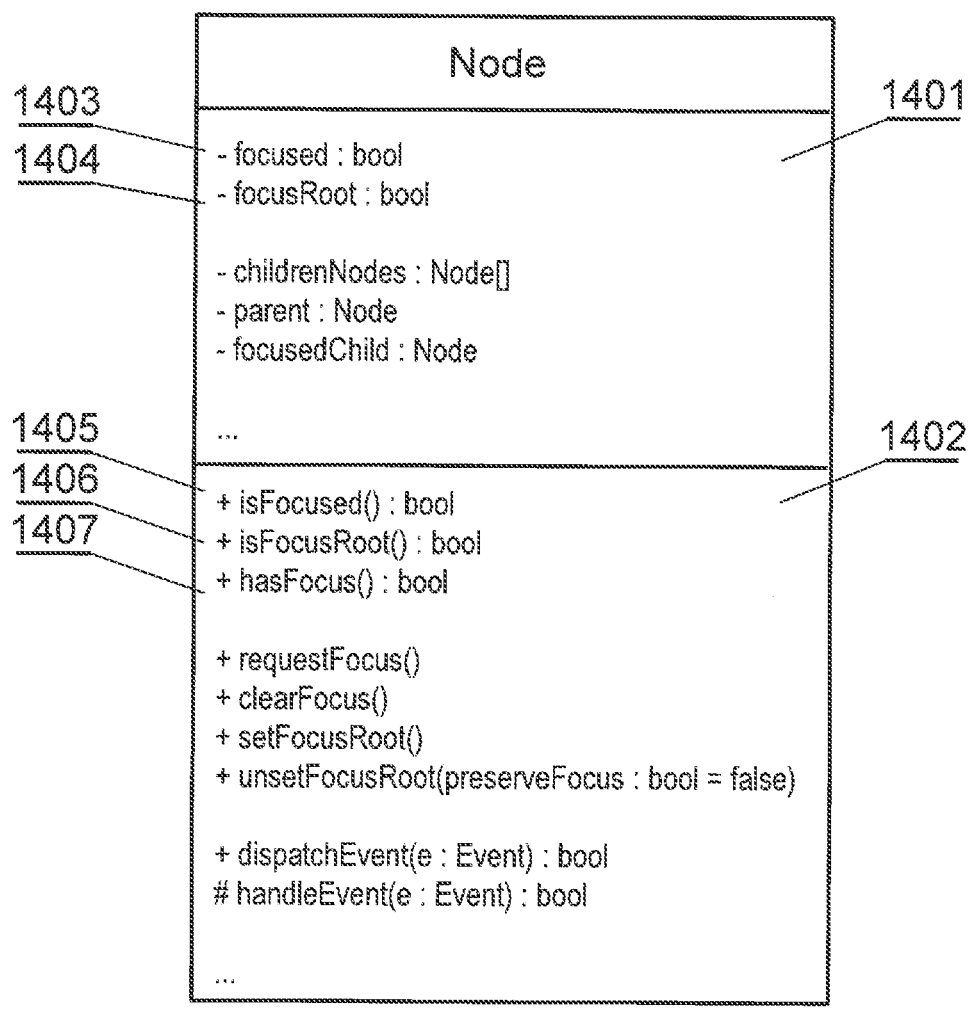
FIG. 14 presents a simplified UML class diagram of an exemplary tree node provided in order to explain details of the present invention.

FIG. 14 presents a simplified UML class diagram of an exemplary object tree node provided in order to explain details of the present invention. The exemplary Node class comprises the attributes of the class 1401 that are representative of the state of the Node object, and methods (operations of the class), marked as 1402 that form functional routines of the Node.

The focused 1403 and the focusRoot 1404 attributes are preferably both boolean flags (or any other suitable variable type capable of assuming one of two states) that indicate current focused state and focus root state of the given Node object.

These two attributes both preferably have read access methods, isFocused( ) 1405 and isFocusRoot( ) 1406 respectively, which are used to retrieve the given state of the Node object. There is also a hasFocus( ) 1407 method that returns true if the Node object is focused, or any other node within subtree rooted by the Node object is focused (a descendant Node object of the Node object in question).

The mutators (In computer science, a mutator method is a method used to control changes to a variable. They are also widely known as setter methods. Often a setter is accompanied by a getter (also known as an accessor), which returns the value of the private member variable) of the focused attribute are requestFocus( ) and clearFocus( ) methods. The requestFocus( ) method is used to enable (set to true) the focused attribute, while clearFocus( ) disables (sets to false) the respective attribute. Both these methods correctly maintain a single focus within monofocus subsection comprising the Node object, and take care of other focus related states of all nodes of the tree.

Similarly, mutators of the focusRoot attribute are setFocusRoot( ) and unsetFocusRoot( ) methods, where the setFocusRoot( ) method is used to enable the focusRoot attribute. The unsetFocusRoot( ) provides a means for disabling the focusRoot attribute with a preserveFocus option, that allows to make a decision on how to resolve potential single focus problems within a resulting monofocus subsection comprising the Node object that will effectively be created.

The childrenNodes attribute holds direct children nodes of the Node object that all, starting from the root Node object, forms the nodes tree, while, in a preferred embodiment of the present invention, the parent attribute holds a direct reference to a parent Node object (except for the root Node object that does not have a parent).

There preferably also exists a special focusedChild attribute that indicates the node's child node which holds (or is) a focus owner within a given monofocus subsection comprising the Node object. The focusedChild attribute is maintained by means of requestFocus( )/clearFocus( ) and setFocusRoot( )/unsetFocusRoot( ) methods.

The Node has also dispatchEvent( ) method that receives an event as input and implements the event's propagation algorithm within the nodes tree. The dispatchEvent( ) method decides which Node objects, and according to which order, will be requested for the event handling, and then passes the event to this Node object's handleEvent( ) method. The handleEvent( ) method is a node specific implementation which is responsible for event "consumption", which ends the event propagation, or just ignore the event, which causes handling an event by next Node object in event propagation order.

Figure 15:
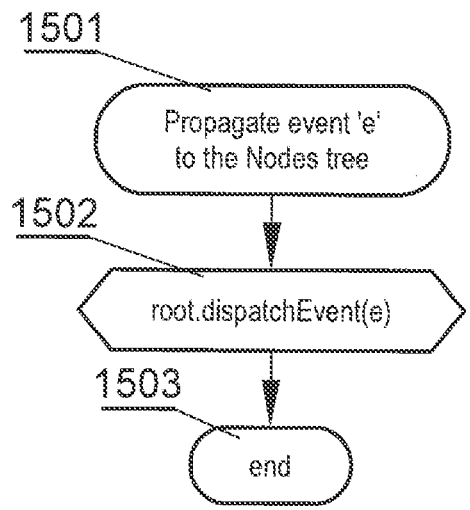
FIG. 15 and FIG. 16 shows top level view of event propagation method according to the present invention.
Figure 16:
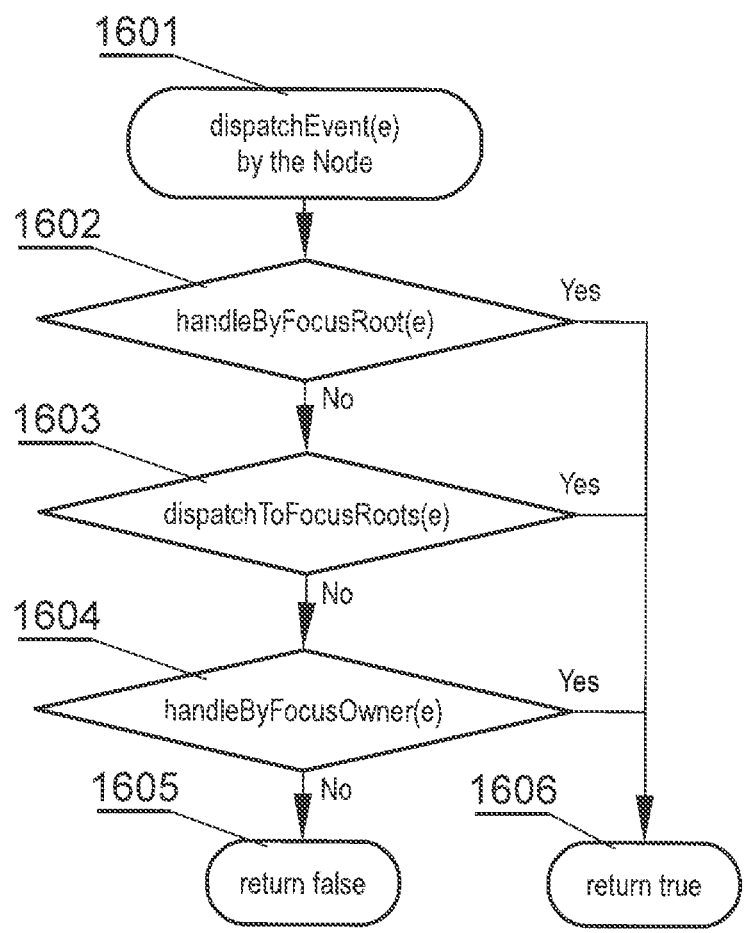

FIG. 15 and FIG. 16 show event propagation method according to the present invention. At step 1501 in FIG. 15 the system (such as Java JRE or similar) propagates an event to the nodes tree of a running software application. Subsequently, at step 1502, the root node object takes over handling of the received event. This event handling has been depicted in more details in FIG. 16. The last step of the process shown in FIG. 15 is the end of the notification process.

FIG. 16 presents a top level of the process defined by event propagation algorithm by each Node object.

The step 1601 forms the Node object's dispatchEvent( ) method entry point that takes as input an event that is being dispatched (such event may for example be received from a keyboard and passed to a running application by a runtime environment such as Java Runtime Environment or the like).

The event propagation process comprises execution of steps 1602, 1603, and 1604 in the given order, which are preferably Node object's private subroutines called handleByFocusRoot( ), dispatchToFocusRoots( ) and handleByFocusOwnerO. Each of these subroutines, similarly to the dispatchEvent( ) method, takes an event as parameter and returns true if the event has been processed (routine has "consumed" the event), or otherwise returns false. The first subroutine that has processed the event causes termination of the dispatchEvent( ) routine at step 1606 (returns true). If none of these subroutines has consumed an event, then the routine ends at step 1605 (returns false).

The execution order of subroutines invoked at steps 1602, 1603, and 1604 guarantees that the event being dispatched will first be processed by focused focus roots subtrees before handling of the event by focused child Node object. This is important feature of the present invention that enables extendability of possibly complex hierarchies by addition of independent focus root nodes that can handle an events before other nodes in the tree without affecting of the focus states of existing tree nodes.

For example, such auxiliary focused focus root nodes can serve as the modal overlay of current graphical user interface components, fully decoupling the events handling logic from the other components in the objects hierarchy tree.

Figure 17:
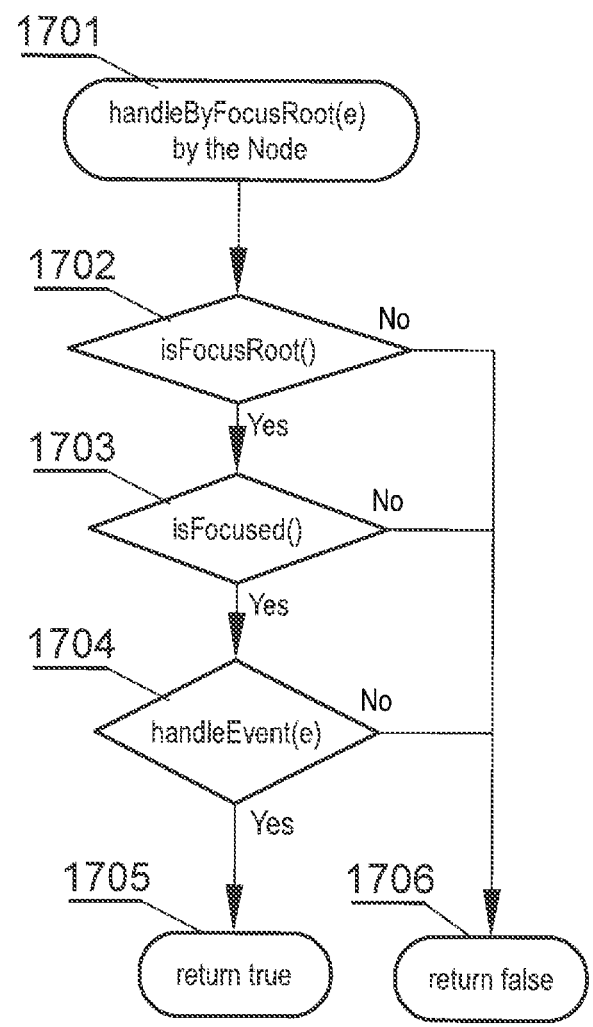
FIG. 17, FIG. 18 and FIG. 19 present details of an event propagation method.

FIG. 17 presents the aforementioned handleByFocusRoot( ) subroutine, which is a first step of the event propagation routine presented in FIG. 16 as step 1602.

The step 1701 forms an entry point of the subroutine that takes as input an event that is being processed. The routine comprises checking at steps 1702, and 1703 whether the Node object is a focused focus root and if so, handling of an event at step 1704 is performed. If that event is handled, then the subroutine ends at step 1705 (returns true). Otherwise the subroutine ends at step 1706 (returns false).

Figure 18:
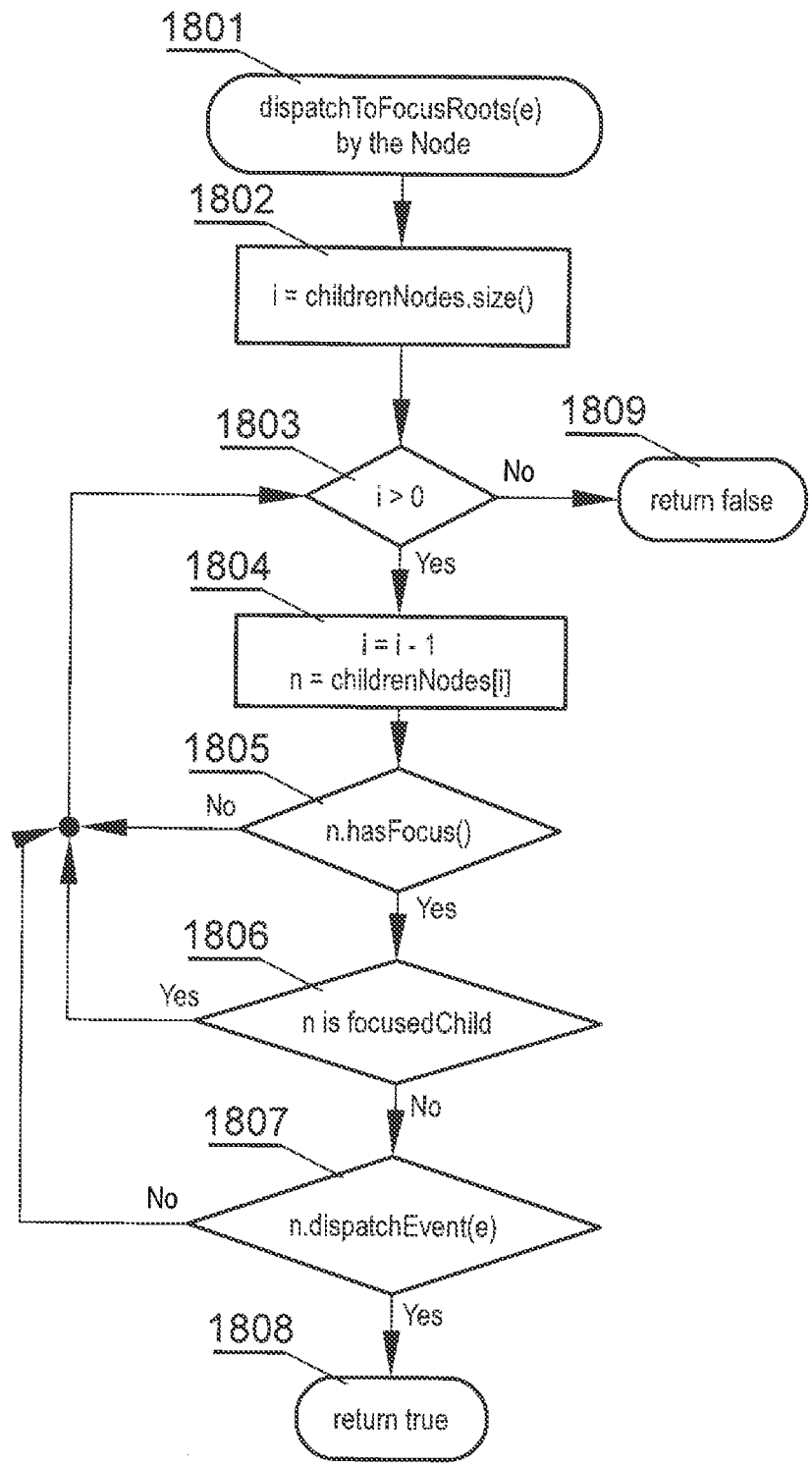

FIG. 18 presents the dispatchToFocusRoots( ) subroutine which is a second step of the aforementioned event propagation routine presented in FIG. 16 as step 1603.

The step 1801 forms an entry point of the subroutine that takes as input an event that is being processed. The routine comprises of a loop that iterates, in reverse z-order, all children nodes of the Node object that has the focus, but are not a focus owner child of the monofocus subsection comprising the given Node object. The loop is initialized at step 1802, and a loop end condition is checked at step 1803.

The child node for event processing is determined at step 1804. Conditions that are mandatory for a child node are checked at steps 1805 and 1806 which ensure that a subtree rooted by this child Node contains at least one focused monofocus subtree and is not currently focused child of the Node (processing of which is postponed to handleByFocusOwner( ) subroutine). And then, if the child node meets the conditions, an event is dispatched to that node (that is, dispatchEvent( ) method is invoked on it) at step 1807. If an event has been consumed by the child node, then the routine ends at step 1808 (returns true). Otherwise, the subroutine continues the loop from step 1803, and, if there are no more children nodes to process, ends at step 1809 (returns false).

Figure 19:
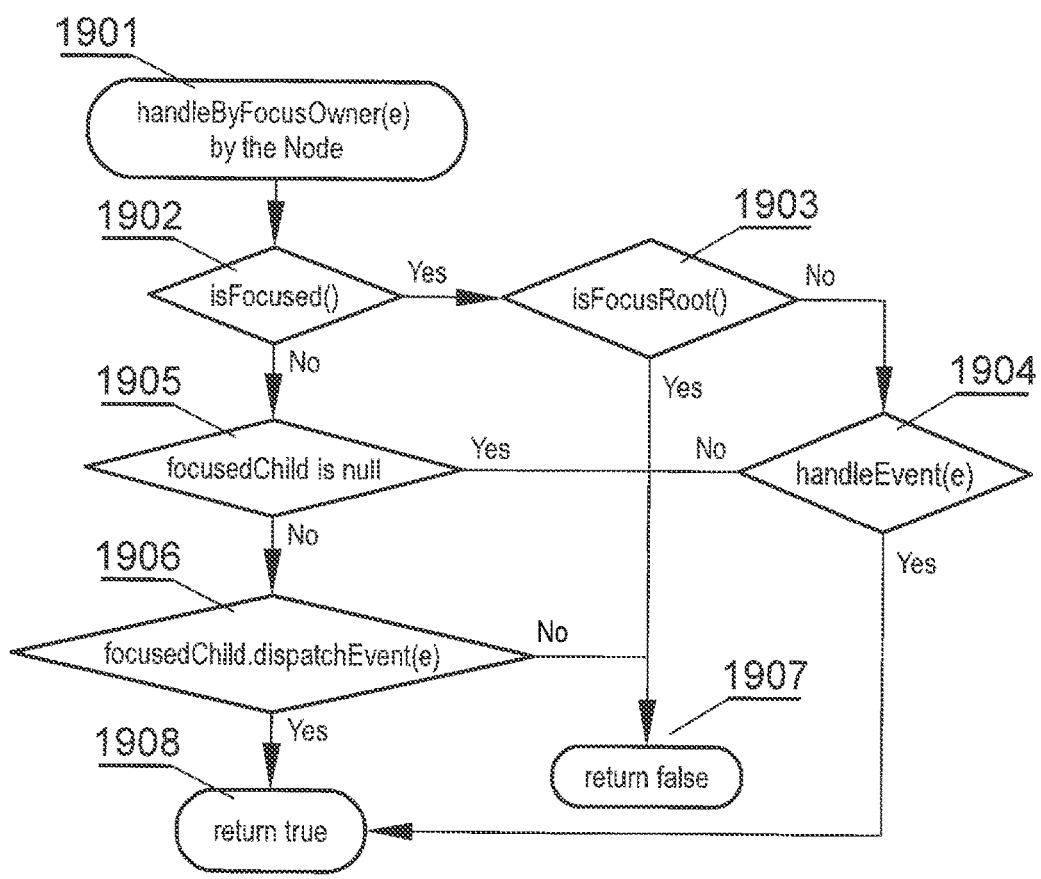

FIG. 19 presents the handleByFocusOwner( ) subroutine which is a third step of the aforementioned event propagation routine presented in FIG. 16 as step 1604.

Step 1901 forms an entry point of the subroutine that takes as input an event that is being processed. The routine comprises dispatching of the received event to the focused child node (if any) or, if the given Node object is focused, handling the event by the Node object itself. Checks performed at steps 1902 and 1903 ensure that the event has not been already processed by a focused focus root node (by handleByFocusRoot( ) subroutine), and if so then the event is being handled by the Node object at step 1904.

Alternatively, if there is a focused child set for the Node object, which is ensured at step 1905, then an event is dispatched to that child node. If an event is either handled by the Node object, or consumed by focused child node, then the routine ends at step 1908 (returns true). Otherwise the subroutine ends at step 1907 (returns false).

Figure 20:
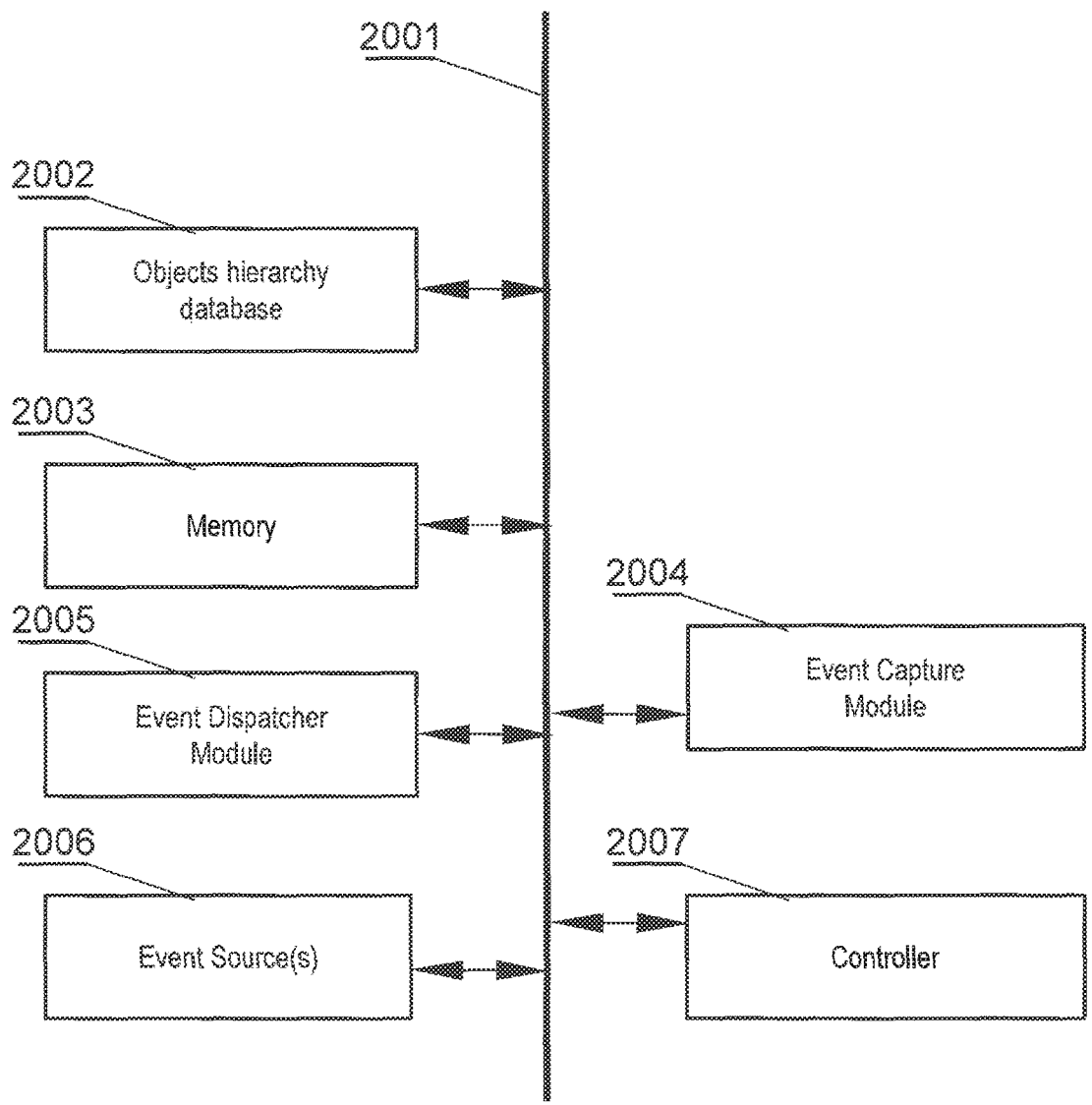
FIG. 20 presents a system according to the present invention.

FIG. 20 presents the system according to the present invention. The system may be realized using dedicated components or custom made FPGA (Field Programmable Gate Array) or ASIC (Application Specific Integrated Circuit) circuits or as a combination of software and hardware. The system comprises a data bus 2001 (such as for example I2C) communicatively coupled to a memory 2002. Additionally, other components of the system are communicatively coupled to the system bus 2001 so that they may be managed by a controller 2003.

The system comprises further events sources controller 2006 for monitoring hardware event sources such as a computer keyboard or a mouse in order to receive events and notify them, by means of the event capture module 2004 to an event dispatcher module 2005. The event dispatcher module 2005, under the supervision of the main controller 2003, manages dispatching events to respective objects, in a given hierarchy of application objects, that are stored in an objects hierarchy database 2002. Each object in the objects hierarchy database 2002 is a Node object according to definition of FIG. 14 and the event dispatcher module 2005 operates according to a method defined in FIG. 15 to FIG. 19.

The main controller 2003 may also be configured to execute one or more software applications stored in the memory 2002. The applications preferably comprise graphical user interface.

While all exemplary embodiments depict a three level objects structure, one skilled in the are will easily apply the same approach to objects structures having fever or more logical levels of objects.

The multiple focus management using focus roots allows for simple, resources effective multifocus management. There is not required a window manager and returning to a previously focused object is very simple. Further there is not required a sophisticated focus manager of many focus managers running in parallel. Event processing is executed at the level of nodes that control consuming.

Additionally, it is to be noted that it is allowable that all objects are focused objects.

The distribution of events in branches which are focus roots may be executed from the newest to the oldest object.

It can be easily recognized, by one skilled in the art, that the aforementioned method for determining an index of an object in a sequence of objects may be performed and/or controlled by one or more computer programs. Such computer programs are typically executed by utilizing the computing resources of the device. The computer programs can be stored in a non-volatile memory, for example a flash memory or in a volatile memory (or otherwise a non-transitory computer readable medium), for example RAM and are executed by the processing unit. These memories are exemplary recording media for storing computer programs comprising computer-executable instructions performing all the steps of the computer-implemented method according to the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims is envisaged in the present application.

The invention claimed is:

1. A method for focus management in a software application, wherein at least a subset of Node objects of said software application forms a hierarchy of Node objects and wherein each Node object of said hierarchy of Node objects of said software application comprises:
   a first routine (1405) that when returning true denotes that the Node object is a focused one; and
   a second routine(1407) that when returning true denotes that the Node object is a focused, or at least one of its descendants is a focused;
   a routine for handling an incoming event;

wherein the method comprises the steps of:
providing, for each Node object of said hierarchy of Node objects a third routine (1406), that when returning true denotes that the Node object and all descendants of the Node object, excluding these Node objects for which the third routine returns true, forms a single monofocus area (805, 907, 909) having a single focus root.

2. The method according to claim 1 wherein the first routine is a isFocused( ) routine, the second routine is an hasFocus( ) routine and the third routine is a isFocusRoot( ) routine.

3. The method according to claim 1 wherein the routine for handling an incoming event (1601) is such that it guarantees that the event being dispatched will first be processed by focused focus roots Node objects before handling of the event by focused child Node object.

4. The method according to claim 3 wherein the routine for handling an incoming event (1601) comprises the steps of:
handling the event by a focus root;
dispatching the event to focus roots; and
handling the event by a focus owner.

5. The method according to claim 4 wherein the handling the event by a focus root comprises the steps of:
checking (1702, 1703) whether the Node object is a focused focus root and then:
handling of the event (1704).

6. The method according to claim 4 wherein the dispatching the event to focus roots comprises the steps of:
iterating in a loop, in reverse z-order, all children nodes of the Node object that has the focus, except for child node that is focused or has descendant a focus owner child of the monofocus subsection comprising the given Node object;
dispatching the event to the Node objects that are found to be a focused focus roots.

7. The method according to claim 4 wherein the handling of the event by a focus owner comprises of the step:
dispatching of the event to the focused child node (1906) or, if the given Node object is focused and is not focus root, handling the event by the Node object itself (1904).

8. The method according to claim 1 wherein it further comprises a step of:
providing for each Node object a fourth routine unsetting the property referred to by said third routine wherein the fourth routine takes a preserve focus parameter as an input and is configured to:
clear focus on all conflicting nodes while preserving the focus where it was before the fourth routine execution.

9. The method according to claim 8 wherein the conflict of focus exists with a parent monofocus subsection (1205), to which the monofocus subsection (1204) under consideration is to be joined.

10. A non-transitory computer readable medium storing computer-executable instructions performing all the steps of the method according to claim 1 when executed on a computer.

11. A system for focus management the system comprising:
a data bus (2001) communicatively coupled to a memory (2002);
a controller (2003) communicatively coupled to the system bus (2001);
an events sources controller (2006) for monitoring hardware event sources in order to receive events and notify the events, by means of the event capture module (2004) to an event dispatcher module (2005);
wherein the event dispatcher module (2005) is configured to, under the supervision of the main controller (2003), manage dispatching events to respective objects, in a given hierarchy of application objects, that are stored in an objects hierarchy database (2002)
wherein each object in the objects hierarchy database (2002) is a Node object according to claim 1.

12. The system according to claim 11 wherein the main controller (2003) is configured to execute one or more software applications stored in the memory (2002).

13. The system according to claim 12 wherein the applications preferably comprise graphical user interface.

* * * * *